(12) United States Patent
Suzuki et al.

(10) Patent No.: US 9,352,618 B2
(45) Date of Patent: May 31, 2016

(54) PNEUMATIC TIRE WITH TREAD HAVING FIVE RIBS AND FOUR CIRCUMFERENTIAL GROOVES

(75) Inventors: Takayuki Suzuki, Hiratsuka (JP); Hiroshi Iizuka, Hiratsuka (JP); Yoshihisa Inoue, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 343 days.

(21) Appl. No.: 13/111,911

(22) Filed: May 19, 2011

(65) Prior Publication Data

US 2011/0220259 A1     Sep. 15, 2011

Related U.S. Application Data

(63) Continuation of application No. PCT/JP2009/069813, filed on Nov. 24, 2009.

(30) Foreign Application Priority Data

Nov. 21, 2008 (JP) .................................. 2008-298516

(51) Int. Cl.
*B60C 11/04* (2006.01)
*B60C 11/00* (2006.01)

(52) U.S. Cl.
CPC ............ *B60C 11/00* (2013.01); *B60C 11/0083* (2013.04); *B60C 11/04* (2013.01); *B60C 2011/039* (2013.04); *B60C 2011/0353* (2013.04); *B60C 2011/0388* (2013.04); *B60C 2200/06* (2013.04)

(58) Field of Classification Search
CPC .................. B60C 11/0083; B60C 2011/0353; B60C 2011/0388; B60C 2011/039; B60C 11/04

USPC ........................ 152/209.14, 209.18, 901, 902
See application file for complete search history.

(56) References Cited

U.S. PATENT DOCUMENTS 4,480,671 A * 11/1984 Giron ........................ 152/209.14
4,724,878 A    2/1988 Kabe et al.
(Continued)

FOREIGN PATENT DOCUMENTS

CN    1739990    3/2006
CN    1990283    7/2007
(Continued)

OTHER PUBLICATIONS

Machine translation for Japan 2001-240707 (no date).*
(Continued)

*Primary Examiner* — Steven D Maki
(74) *Attorney, Agent, or Firm* — Thorpe North & Western

(57) ABSTRACT

A pneumatic tire has a plurality of circumferential main grooves extending in a tire circumferential direction and a plurality of ribs partitioned by the circumferential main grooves in a tread portion. When viewing a cross-section from a tire meridian direction a contact patch of the center ribs is formed from a smooth curved line forming a convex on an outer side in a tire radial direction and a contact patch of the shoulder rib is formed from a smooth curved line forming a convex on an inner side in the tire radial direction. The curved line of the center ribs and the curved line of the shoulder rib have a point of intersection. A distance between an extended line of the curved line of the center ribs and the curved line of the shoulder rib increases from the point of intersection towards an outer side in a tire width direction.

13 Claims, 4 Drawing Sheets

(56) References Cited

U.S. PATENT DOCUMENTS

| | | | |
|---|---|---|---|
| 4,884,606 A * | 12/1989 | Matsuda et al. | 152/209.18 |
| 5,120,209 A * | 6/1992 | MacMillan | 425/46 |
| 5,211,781 A * | 5/1993 | Adam et al. | 152/209.25 |
| 5,616,195 A | 4/1997 | Marquet et al. | |
| 5,660,652 A * | 8/1997 | Young et al. | 152/209.14 |
| 5,795,415 A * | 8/1998 | Campana et al. | 152/209.18 |
| 5,843,249 A * | 12/1998 | Ryba et al. | 152/209.1 |
| 6,082,424 A | 7/2000 | Miyazaki | |
| 2001/0050125 A1* | 12/2001 | Neises | 152/209.12 |
| 2006/0048874 A1 | 3/2006 | Maruoka | |
| 2007/0084533 A1 | 4/2007 | Numata | |
| 2007/0151646 A1 | 7/2007 | Ito | |

FOREIGN PATENT DOCUMENTS

| | | | |
|---|---|---|---|
| EP | 738614 A1 * | 10/1996 | |
| EP | 1184206 A1 * | 3/2002 | |
| JP | 56-047306 | 4/1981 | |
| JP | 63-240403 | 10/1988 | |
| JP | 02-041909 A * | 2/1990 | |
| JP | 02-077306 A * | 3/1990 | |
| JP | 05-077608 | 3/1993 | |
| JP | 5-330315 | 12/1993 | |
| JP | 2000-233606 | 8/2000 | |
| JP | 2001-240707 A * | 9/2001 | |
| JP | 2004-307619 | 11/2004 | |
| JP | 2006-021702 | 1/2006 | |
| JP | 2006-062518 | 3/2006 | |
| JP | 2007-137411 | 6/2007 | |
| JP | 2007-182097 | 7/2007 | |
| JP | 2001-301425 | 10/2009 | |
| JP | 2009/262888 | 11/2009 | |
| WO | WO 2004/028836 | 4/2004 | |

OTHER PUBLICATIONS translation for Japan 02-077306 (no date).*
PCT Application PCT/JP2009/069813; filed Nov. 24, 2009; Takayuki Suzuki; ISR mailed Feb. 16, 2010.

* cited by examiner

| | Conventional Example | Comparative Example | Working Example 1 | Working Example 2 | Working Example 3 | Working Example 4 | Working Example 5 | Working Example 6 | Working Example 7 | Working Example 8 | Working Example 9 | Working Example 10 |
|---|---|---|---|---|---|---|---|---|---|---|---|---|
| Contact patch of the tread portion center region | Convex curved line on top | Convex curved line on top | Convex curved line on top | Convex curved line on top | Convex curved line on top | Convex curved line on top | Convex curved line on top | Convex curved line on top | Convex curved line on top | Convex curved line on top | Convex curved line on top | Convex curved line on top |
| Contact patch of the tread portion shoulder region | Convex curved line on top | Convex curved line on bottom | Convex curved line on bottom | Convex curved line on bottom | Convex curved line on bottom | Convex curved line on bottom | Convex curved line on bottom | Convex curved line on bottom | Convex curved line on bottom | Convex curved line on bottom | Convex curved line on bottom | Convex curved line on bottom |
| Distance d | | Center vicinity is concave on the inner side in the radial direction | Difference increases towards the contact edge side | Difference increases towards the contact edge side | Difference increases towards the contact edge side | Difference increases towards the contact edge side | Difference increases towards the contact edge side | Difference increases towards the contact edge side | Difference increases towards the contact edge side | Difference increases towards the contact edge side | Difference increases towards the contact edge side | Difference increases towards the contact edge side |
| GW/TW | 0.25 | 0.25 | 0.25 | 0.15 | 0.20 | 0.20 | 0.20 | 0.20 | 0.20 | 0.20 | 0.20 | 0.20 |
| PW/(TW/2) | 0.6 | 0.6 | 0.7 | 0.7 | 0.7 | 0.5 | 0.65 | 0.6 | 0.6 | 0.6 | 0.6 | 0.6 |
| TWsh/(TW/2) | 0.35 | 0.35 | 0.35 | 0.35 | 0.35 | 0.35 | 0.35 | 0.35 | 0.40 | 0.40 | 0.40 | 0.40 |
| TWsh/TWx | 1.0 | 1.0 | 1.0 | 1.0 | 1.0 | 1.0 | 1.0 | 1.0 | 1.0 | 1.05 | 1.05 | 1.05 |
| TWsh/TWc | 1.0 | 1.0 | 1.0 | 1.0 | 1.0 | 1.0 | 1.0 | 1.0 | 1.0 | 1.0 | 1.05 | 1.05 |
| TWsh/GWsh | 1.8 | 1.8 | 1.8 | 1.8 | 1.8 | 1.8 | 1.8 | 1.8 | 1.8 | 1.8 | 1.8 | 2.0 |
| Presence of Narrow groove | Absent | Absent | Absent | Absent | Absent | Absent | Absent | Present | Present | Present | Present | Present |
| Uneven-wear resistance | 100 | 100 | 120 | 130 | 125 | 140 | 135 | 150 | 160 | 165 | 170 | 175 |

FIG. 3

| | Working Example 10 | Working Example 11 | Working Example 12 | Working Example 13 | Working Example 14 | Working Example 15 | Working Example 16 |
|---|---|---|---|---|---|---|---|
| Contact patch of the tread portion center region | Convex curved line on top | Convex curved line on top | Convex curved line on top | Convex curved line on top | Convex curved line on top | Convex curved line on top | Convex curved line on top |
| Contact patch of the tread portion shoulder region | Concave curved line on bottom | Concave curved line on bottom | Concave curved line on bottom | Concave curved line on bottom | Concave curved line on bottom | Concave curved line on bottom | Concave curved line on bottom |
| Distance d | Difference increases towards the contact edge side | Difference increases towards the contact edge side | Difference increases towards the contact edge side | Difference increases towards the contact edge side | Difference increases towards the contact edge side | Difference increases towards the contact edge side | Difference increases towards the contact edge side |
| Mixing method | Conventional | Conventional | Conventional | Conventional | Conventional | 1-step roll | 1-step roll |
| 1st step extrusion temperature | 160 | 160 | 160 | 160 | 130 | 130 | 130 |
| Rubber composition | Natural rubber | 100 | 100 | 100 | 100 | 100 | 100 | 100 |
| | Carbon black 1 | 52 | 57 | - | 52 | 52 | 48 | - |
| | Carbon black 2 | - | - | 57 | - | - | - | 52 |
| | Zinc oxide | 3.0 | 3.0 | 3.0 | 3.0 | 3.0 | 3.0 | 3.0 |
| | Stearic acid | 1.0 | 1.0 | 1.0 | 1.0 | 1.0 | 1.0 | 1.0 |
| | Antiaging agent | 2.0 | 2.0 | 2.0 | 2.0 | 2.0 | 2.0 | 2.0 |
| | Sulfur | 2.0 | 2.0 | 2.0 | 2.4 | 2.0 | 2.2 | 2.4 |
| | Vulcanization accelerator | 1.5 | 1.5 | 1.5 | 1.5 | 1.5 | 1.5 | 1.5 |
| 26°C hardness | 64 | 67 | 65 | 66 | 65 | 67 | 68 |
| EB | 450 | 395 | 375 | 390 | 470 | 510 | 480 |
| Tan δ at 60°C: Distortion of 10±2% | 0.12 | 0.14 | 0.12 | 0.11 | 0.13 | 0.12 | 0.12 |
| Wear resistance | 100 | 104 | 97 | 102 | 104 | 122 | 130 |
| Uneven-wear resistance | 175 | 182 | 169 | 172 | 181 | 213 | 228 |

FIG. 4

PNEUMATIC TIRE WITH TREAD HAVING FIVE RIBS AND FOUR CIRCUMFERENTIAL GROOVES

CROSS-REFERENCE TO RELATED APPLICATIONS

This application is a continuation of PCT Patent Application No. PCT/JP2009/069813, filed on Nov. 24, 2009 which claims the benefit of priority of the prior Japanese Patent Application No. 2008-298516, filed on Nov. 21, 2008, the entire contents of which is incorporated herein by reference.

BACKGROUND

1. Technical Field

The present disclosure relates to a pneumatic tire, and more specifically, to a pneumatic tire having enhanced uneven-wear resistance performance.

2. Related Art

A construction is adopted in conventional pneumatic tires in which, when a cross-section is viewed from a tire meridian direction, a contact patch of a shoulder rib arches and forms a convex on an inner side of a tire radial direction. Due to this construction, contact pressure of the tire is distributed evenly over a center region and a shoulder region of a tread portion and uneven wear of the tire is suppressed.

An object of the present disclosure is to provide a pneumatic tire having enhanced uneven-wear resistance performance.

SUMMARY

In order to achieve the aforementioned object, a pneumatic tire of the present disclosure is provided that includes, in a tread portion, a plurality of circumferential main grooves extending in a tire circumferential direction and a plurality of ribs formed by the circumferential main grooves partitioning the tread portion, wherein, when a cross-section is viewed from a tire meridian direction, a contact patch of the ribs in a center region of the tread portion (hereinafter referred to as "center ribs") is formed from a smooth curved line forming a convex on an outer side in a tire radial direction, and a contact patch of the rib in a shoulder region of the tread portion (hereinafter referred to as "shoulder rib") is formed from a smooth curved line forming a convex on an inner side in the tire radial direction; and based on a point of intersection P of the curved line of the center ribs and the curved line of the shoulder rib, a distance between an extended line of the curved line of the center ribs and the curved line of the shoulder rib increases from the point of intersection P towards an outer side in a tire width direction.

In this pneumatic tire, contact pressure on a contact edge side of the shoulder rib is increased by optimizing a radial construction of the tread portion. This increase leads to an enhancement in the uneven-wear resistance performance of the tire because slipping of the entire tire is reduced.

According to another aspect of the present disclosure, a gross width GW of groove widths of the circumferential main grooves and a tread width TW of the pneumatic tire satisfy a relationship $0.15 \leq GW/TW \leq 0.20$.

With this pneumatic tire the ratio GW/TW of the gross width GW of the groove widths to the tread width TW of the tread portion is optimized so a gauge of the tread portion on a belt layer can be thickened. Thus, variations of tread rubber in the tire circumferential direction during tire rotation are suppressed due to an increase in stiffness of the shoulder region of the tread portion. This suppression leads to an enhancement in the uneven-wear resistance performance of the tire.

According to yet another aspect of the present disclosure, the pneumatic tire includes four circumferential main grooves and satisfies a relationship of $0.5 \leq PW/(TW/2) \leq 0.65$ between a distance PW from a tire equator surface to the point of intersection P and the tread width TW.

With this pneumatic tire, a position of an inflection point (the point of intersection P) of the tread radius is optimized, so there is an advantageous enhancement in the uneven-wear resistance performance. Note that the point of intersection P is preferably positioned in the circumferential main grooves.

According to yet another aspect of the present disclosure, a narrow groove extending in the tire circumferential direction is disposed in a vicinity of a ground contact edge of the shoulder rib of the pneumatic tire.

With this pneumatic tire, contact pressure in the vicinity of the ground contact edge is reduced due to the disposed narrow groove. The reduction leads to an enhancement in the uneven-wear resistance performance of the tire.

According to yet another aspect of the present disclosure, a center part of the shoulder rib of the pneumatic tire has a sipeless construction.

With this pneumatic tire, because the center part of the shoulder rib is not segmented by sipes, the stiffness of the shoulder rib is ensured. This construction leads to an enhancement in the uneven-wear resistance performance of the tire.

According to yet another aspect of the present disclosure, the tread width TW, the gross width GW of the groove widths of the circumferential main grooves, a width TWc of the center rib, a width TWx of the rib between the center rib and the shoulder rib, and a width TWsh of the shoulder rib of the pneumatic tire satisfy $TWsh/(TW/2) \geq 0.40$, $TWsh/TWx \geq 1.05$, $TWsh/TWc \geq 1.05$, and $0.20 \geq GW/TW \geq 0.15$.

With this pneumatic tire, a proportion of a groove area of the circumferential main grooves in the tread portion is set so as to be smaller than a specified value, and a proportion of the ground contact width of the shoulder rib, upon which the greatest shearing force is exerted during lateral force travelling, is set so as to be greater than the specified value. Thus, a modulus of rigidity of the entire tread portion increases and, therefore, a slip angle when a lateral force acts during market driving is reduced. This reduction leads to an enhancement in uneven-wear resistance performance with respect to lateral force slipping because slipping in the shoulder region of the tread portion is reduced.

According to yet another aspect of the present disclosure, a groove depth GDsh of the circumferential main groove that partitions the shoulder rib and the width TWsh of the pneumatic tire satisfy $TWsh/GDsh \geq 2.00$.

With this pneumatic tire the ratio TWsh/GDsh of the groove depth GDsh of the circumferential main grooves that partition the shoulder rib to the width TWsh is optimized so the modulus of rigidity of the shoulder rib increases and the modulus of rigidity of the entire tire increases. This increase leads to an enhancement in uneven-wear resistance performance with respect to lateral force slipping.

According to yet another aspect of the present disclosure, a rubber hardness of the shoulder rib of the pneumatic tire is 60 or higher according to Japanese Industrial Standard (JIS) K6253.

With this pneumatic tire the modulus of rigidity of the shoulder rib increases and the modulus of rigidity of the entire tire increases because the rubber hardness of the shoulder rib is optimized. This increase leads to an enhancement in uneven-wear resistance performance with respect to lateral force slipping.

According to yet another aspect of the present disclosure, the shoulder rib of the pneumatic tire includes a narrow groove.

With this pneumatic tire uneven wear of the shoulder rib can be suppressed by proactively wearing down a wear sacrifice rib during tire rotation. The suppression leads to an enhancement in the uneven-wear resistance performance of the tire.

According to yet another aspect of the present disclosure, the pneumatic tire is applied to a heavy-duty pneumatic tire.

With heavy-duty pneumatic tires, high loads are applied, so it is easy for uneven wear to occur. Therefore, applying the present technology to heavy-duty pneumatic tires leads to more remarkable enhancements in the uneven wear resistance performance of the tire.

According to yet another aspect of the present disclosure, a rubber hardness at 20° C. according to JIS-K6253 of a rubber composition used in a cap tread of the pneumatic tire is 66 or higher.

With this pneumatic tire, the rubber hardness of the rubber composition is optimized. This leads to enhancements in the abrasion resistance performance and the uneven-wear resistance performance of the tire.

According to yet another aspect of the present disclosure, the rubber composition of the pneumatic tire has an elongation at break of 400% or greater, a distortion of 10±2%, and a tan δ value at 60° C. of less than 0.14.

With the present pneumatic tire, elongation at break and heat generation properties of the rubber composition are optimized, which leads to enhancements in the abrasion resistance performance and the uneven-wear resistance performance of the tire.

With the present pneumatic tire, contact pressure on the contact edge side of the shoulder rib is increased by optimizing the radial construction of the tread portion. This increase leads to an enhancement in the uneven-wear resistance performance of the tire because slipping of the entire tire is reduced.

BRIEF DESCRIPTION OF THE DRAWINGS

FIG. 3 is a table showing the results of performance testing 1 of pneumatic tires according to examples of the present technology.

FIG. 4 is a table showing the results of performance testing 2 of pneumatic tires according to examples of the present technology.

DETAILED DESCRIPTION

The present technology is explained in detail below while referencing the drawings. The examples of the present technology explained below do not limit the present technology. Moreover, constituents of the examples which can possibly or obviously be substituted while maintaining consistency with the present technology are included. The various modified examples described below may be incorporated within the scope obvious to those skilled in the art.

Figure 1:
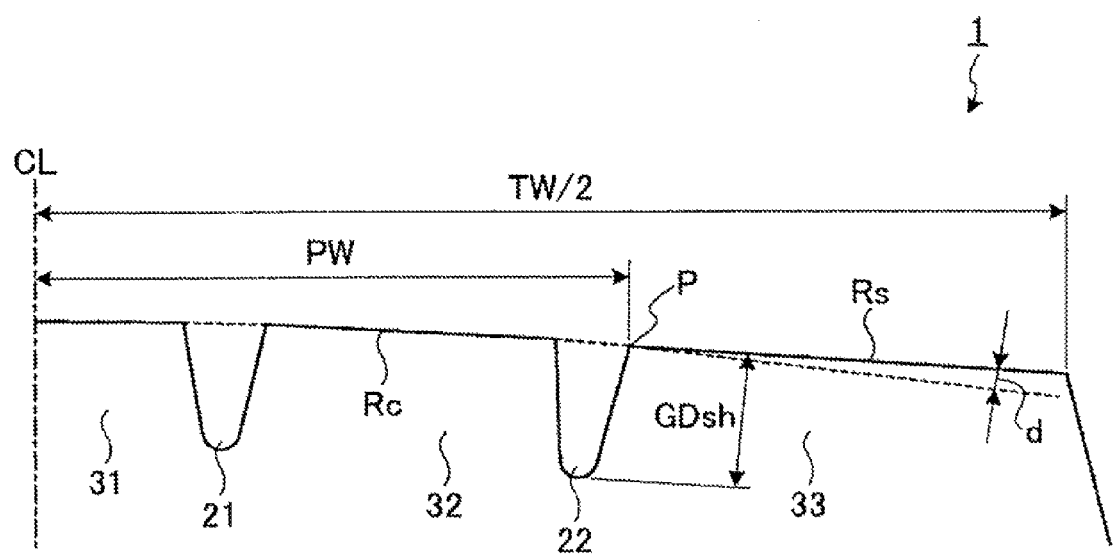
FIG. 1 is a cross-sectional view in a tire meridian direction of a tread portion of a pneumatic tire according to an example of the present technology.
Figure 2:
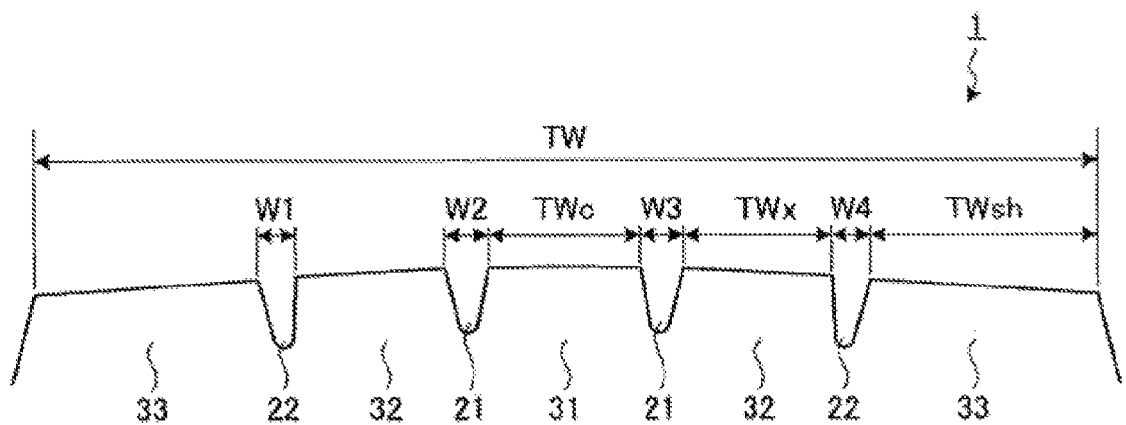
FIG. 2 is a cross-sectional view in the tire meridian direction of a tread portion of a pneumatic tire according to the example of the present technology.

FIG. 1 and FIG. 2 are cross-sectional views in a tire meridian direction of a tread portion of a pneumatic tire according to an example of the present technology. FIG. 3 is a table showing the results of performance testing 1 of pneumatic tires according to the example of the present technology.

Pneumatic Tire

A pneumatic tire 1 has a plurality of circumferential main grooves 21, 22, extending in a tire circumferential direction and a plurality of ribs 31, 32, 33, partitioned by the circumferential main grooves 21, 22 (see FIG. 1 and FIG. 2). For example, four of the circumferential main grooves 21, 22 are formed in the tread portion. A center region of the tread portion is partitioned into three center ribs 31, 32 by these circumferential main grooves 21, 22, and shoulder ribs 33 are partitioned in left and right shoulder regions of the tread portion, respectively. In this way, a rib-based tread pattern is formed.

Radial Construction of the Tread Portion

Additionally, when viewing a cross-section from a tire meridian direction, a contact patch of the center ribs 31, 32 is formed from a smooth curved line Rc forming a convex on an outer side in a tire radial direction, and a contact patch of the shoulder rib 33 is formed from a smooth curved line Rs forming a convex on an inner side in the tire radial direction (see FIG. 1). Note that the curved line Rc of the center ribs 31, 32 and the curved line Rs of the shoulder rib 33 have a point of intersection P. Additionally, a distance (interval) d between an extended line of the curved line Rc of the center ribs 31, 32 and the curved line Rs of the shoulder rib 33 increases from the point of intersection P towards an outer side (contact edge side) in a tire width direction.

For example, when viewing the cross-section from the tire meridian direction, three center ribs 31, 32 are formed in the center region of the tread portion, and the contact patch of these center ribs 31, 32 have the curved line Rc that arches and forms a convex on an outer side in the tire radial direction (see FIG. 1). Additionally, the contact patches of the left and right shoulder ribs 33 have curved lines Rs that arch and form convexes on the inner side in the tire radial direction. In other words, the shoulder ribs 33 have recessed contact patches. Due to this construction, contact pressure is distributed evenly over the center portion of the tread portion and the shoulder region of the tread portion and uneven wear of the tire is suppressed. Additionally, the curved line Rc of the center ribs 31, 32 and the curved line Rs of the shoulder rib 33 intersect at an edge of the shoulder rib 33 on an inner side in the tire width direction, this point of intersection P being an inflection point of a tread radius. Additionally, the extended line curved line Rc of the center ribs 31, 32 is positioned on the inner side in the tire radial direction with respect to the curved line Rs of the shoulder rib 33, and the distance d between the curved lines Rc and Rs increases gradually from the inner side in the tire width direction of the shoulder rib 33 towards the outer side. Moreover, the extended line of the curved line Rc of the center ribs 31, 32 intersects with an outer surface of an outer side in the tire width direction of the shoulder rib 33.

Note that the "contact patch of the tire" refers to a contact surface between a tire and a flat plate in a configuration in which the tire is mounted on an application rim stipulated by The Japan Automobile Tyre Manufacturers Association (JATMA), filled to an internal pressure of 100 kPa, placed perpendicularly with respect to the flat plate in a static state, and loaded with a load corresponding to a stipulated load.

Effect

With this pneumatic tire 1, the contact patch of the center ribs 31, 32 is formed from the smooth curved line Rc forming a convex on the outer side in the tire radial direction, and the contact patch of the shoulder rib 33 is formed from the smooth curved line Rs forming a convex on the inner side in the tire radial direction, and in addition, the distance d between the extended line of the curved line Rc of the center ribs 31, 32 and the curved line Rs of the shoulder rib 33 increases from the point of intersection P towards the outer side in the tire width direction. With such a configuration, contact pressure on the contact edge side of the shoulder rib 33 is increased by optimizing the radial construction of the tread portion. This increase leads to an enhancement in the uneven-wear resistance performance of the tire because slipping of the entire tire is reduced.

Additional Data 1

With the pneumatic tire 1, the gross width GW of the groove widths W1 to W4 of the circumferential main grooves 21, 22 (GW=W1+W2+W3+W4) and the tread width TW preferably satisfy a relationship $0.15 \leq GW/TW \leq 0.20$ (see FIG. 2). With such a configuration, stiffness in the shoulder regions of the tread portion increases because a ratio GW/TW between the gross width GW of the groove widths of the tread portion and the tread width TW is optimized, so variations of tread rubber in the tire circumferential direction during tire rotation are suppressed. The reduction leads to an enhancement in the uneven-wear resistance performance of the tire.

Note that the tread width of the tire is measured when the tire is mounted on an application rim, filled to a specified internal pressure, placed perpendicularly with respect to the flat plate in a static state, and loaded with a load corresponding to a stipulated load.

Herein, "application rim" refers to an "application rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO).

Furthermore, "proper internal pressure" refers to "maximum air pressure" defined by JATMA, the maximum value in "tire load limits at various cold inflation pressures" defined by TRA, or the "inflation pressures" defined by ETRTO.

Moreover, a "stipulated load" refers to "maximum load capacity" defined by JATMA, the maximum value in "tire load limits at various cold inflation pressures" defined by TRA, or "load capacity" defined by ETRTO. However, in the case of passenger car tires, the prescribed internal pressure is an air pressure of 180 kPa, and the stipulated load is 88% of the maximum load capacity.

Furthermore, when four circumferential main grooves 21, 22 are provided in this pneumatic tire 1, the distance PW from the tire equator surface CL to the point of intersection P and the tread width TW preferably satisfy a relationship of $0.5 \leq PW/(TW/2) \leq 0.65$ (see FIG. 1). In such a configuration, the position of the inflection point (the point of intersection P) of the tread radius is optimized, which leads to an enhancement in the uneven-wear resistance performance of the tire. Note that the point of intersection P is preferably positioned in the circumferential main groove 22.

Additionally, with this pneumatic tire 1, the narrow groove (not shown) extending in the tire circumferential direction is preferably disposed in the vicinity of the ground contact edge of the shoulder rib 33. In such a configuration, contact pressure in the vicinity of the ground contact edge is reduced due to the disposed narrow groove. The reduction leads to an enhancement in the uneven-wear resistance performance of the tire. Note that "narrow groove" refers to grooves having a groove width of from 1 mm to 2 mm.

Moreover, with the pneumatic tire 1, the center area of the shoulder rib 33 preferably has a sipeless structure (not shown). In other words, it is preferable that sipes not be formed in the center of the shoulder rib 33 (the parts other than the edges). With this structure, the center of the shoulder rib 33 is not segmented by sipes, so the stiffness of the shoulder rib 33 is ensured. This leads to an enhancement in the uneven-wear resistance performance of the tire. Additionally, the term "sipes" refers to sipes that have a sipe depth of 5 mm or more, and a sipe width of from 1 mm to 2 mm. Moreover, sipes can be disposed at the edges of the shoulder rib 33.

Additional Data 2

With the pneumatic tire 1, the tread width TW, the gross width GW (W1+W2+W3+W4) of the groove widths of the circumferential main grooves 21, 22, a width TWc of the center rib 31, a width TWx (x=1, 2, 3 . . . ) of the rib 32 between the center rib 31 and the shoulder rib 33, and a width TWsh of the shoulder rib 33 preferably satisfy the relationships $TWsh/(TW/2) \geq 0.40$, $TWsh/TWx \geq 1.05$, $TWsh/TWc \geq 1.05$, and $0.20 \geq GW/TW \geq 0.15$. Note that the width TWsh of the shoulder rib 33 is a width of the region, excluding the part having a step, of the shoulder rib 33. Additionally, the groove widths W1 to W4 of the circumferential main grooves 21, 22, and the widths TWc, TWx, and TWsh of the ribs 31 to 33 are measured when the tire is mounted on an application rim, filled to a specified internal pressure, placed perpendicularly with respect to the flat plate in a static state, and loaded with a load corresponding to a stipulated load.

In such a configuration a proportion of a groove area of the circumferential main grooves 21, 22 in the tread portion is set so as to be smaller than a specified value and a proportion of the ground contact width of the shoulder rib 33, upon which the greatest shearing force is exerted during lateral force travelling, is set so as to be greater than the specified value. Thus, a modulus of rigidity of the entire tread portion increases and, therefore, a slip angle when lateral force is applied during market driving is reduced. This reduction leads to an enhancement in uneven-wear resistance performance with respect to lateral force slipping because slipping in the shoulder region of the tread portion is reduced.

Additionally, with the configuration described above, the groove depth GDsh of the circumferential main groove 22 that partitions the shoulder rib 33 and the width TWsh preferably satisfy the relationship $TWsh/GDsh \geq 2.00$ (see FIG. 1 and FIG. 2). With this configuration, the ratio TWsh/GDsh of the groove depth GDsh of the circumferential main groove 22 that partitions the shoulder rib 33 to the width TWs is optimized, so the modulus of rigidity of the shoulder rib increases and the modulus of rigidity of the entire tire increases. This leads to a reduced slip angle when a lateral force acts during market driving and reduced slipping in the shoulder regions of the tread portion. This reduction leads to an enhancement in uneven-wear resistance performance with respect to lateral force slipping.

Additionally, with the configuration described above, the rubber hardness according to Japanese Industrial Standard (JIS) K6253 of the shoulder rib 33 is 60 or higher. In such a configuration, the rubber hardness of the shoulder rib 33 is optimized, so the modulus of rigidity of the shoulder rib 33 increases and the modulus of rigidity of the entire tire increases. This leads to a reduced slip angle when a lateral force acts during market driving and reduced slipping in the shoulder regions of the tread portion. This reduction leads to an enhancement in uneven-wear resistance performance with respect to lateral force slipping.

Additionally, with the configuration described above, the shoulder rib 33 preferably has a narrow groove (not shown). Such a narrow groove is, for example, disposed along an edge of the outer side in the tire width direction of the shoulder rib 33 to form a wear sacrifice rib on the edge of the shoulder rib 33. With such a configuration, uneven wear of the shoulder rib 33 can be suppressed by proactively wearing down the wear sacrifice rib during tire rotation. This leads to an enhancement in the uneven-wear resistance performance of the tires.

Target of Application

The pneumatic tire 1 is preferably applied to heavy-duty pneumatic tires. With heavy-duty pneumatic tires high loads are often applied and it is easy for uneven wear to occur. Therefore, applying the present technology to heavy-duty pneumatic tires leads to more remarkable enhancements in the uneven wear resistance performance of the tire.

Performance Test 1

In this example, uneven-wear resistance performance tests were performed on a plurality of pneumatic tires under a variety of conditions (see FIG. 3). In each of the performance tests, pneumatic tires with a tire size of 11R22.5 are mounted on JATMA stipulated application rims, and two pneumatic tires are attached to the steering axle of a 2-door test vehicle. Moreover, the JATMA defined maximum internal pressure and maximum load are applied to these pneumatic tires. After running the test vehicle on a paved road for 50,000 km, the amount of uneven wear of the shoulder ribs is checked and evaluated according to an index. In this evaluation, a conventional example is set as a standard score (100) and larger numeric scores are preferable.

In the conventional example of a pneumatic tire, when viewing a cross-section from a tire meridian direction, a contact patch of a center region of a tread portion and a contact patch of a shoulder region of a tread portion are formed from a single arch, and have a curved convex shape on an outer side (top) in a tire radial direction. On the other hand, with the pneumatic tires 1 of working examples 1 to 10, the contact patch of the center ribs 31, 32 is formed from a smooth curved line Rc forming a convex on the outer side in the tire radial direction, and the contact patch of the shoulder rib 33 is formed from a smooth curved line Rs forming a convex on the inner side in the tire radial direction, and in addition the distance d between the extended line of the curved line Rc of the center ribs 31, 32 and the curved line Rs of the shoulder rib 33 increases from the point of intersection P towards the outer side in the tire width direction (see FIG. 1).

The test results show that the pneumatic tires of working examples 1 to 10 exhibit enhanced uneven-wear resistance performance (see FIG. 3). Note that the pneumatic tires of working examples 1 to 10 had a common rubber hardness of the shoulder rib according to JIS-K6253 of 60. Additionally, comparing working examples 1 to 3, it is clear that the uneven-wear resistance performance of the tires is further enhanced by the optimization of the ratio GW/TW of the gross width GW of the groove widths of the tread portion to the tread width TW. Moreover, comparing working examples 3 to 5, it is clear that the uneven-wear resistance performance of the tires is still further enhanced by the optimization of the position PW/(TW/2) of the inflection point (point of intersection P) of the tread radius. Additionally, it is clear from working example 6 that the uneven-wear resistance performance of the tires is yet further enhanced by the disposing of the narrow groove in the vicinity of the ground contact edge of the shoulder rib 33. Furthermore, it is clear from the pneumatic tires 1 of working examples 7 to 10 that the uneven-wear resistance performance of the tires is yet further enhanced by the optimization of the rib widths.

Performance Test 2

FIG. 4 is a table showing the results of performance test 2 of the pneumatic tires according to the example of the present technology.

In the performance test 2, abrasion resistance performance and uneven-wear resistance performance tests were performed on a plurality of pneumatic tires under a variety of conditions (see FIG. 4). Note that these performance tests were performed based on the performance test 1 described above. In the abrasion resistance performance tests, working example 10 is set as a standard score (100) and larger numeric scores are preferable.

With the pneumatic tires 1 of working examples 10 to 16, the contact patch of the center ribs 31, 32 is formed from a smooth curved line Rc forming a convex on the outer side in the tire radial direction, and the contact patch of the shoulder rib 33 is formed from a smooth curved line Rs forming a convex on the inner side in the tire radial direction, and in addition the distance d between the extended line of the curved line Rc of the center ribs 31, 32 and the curved line Rs of the shoulder rib 33 increases from the point of intersection P towards the outer side in the tire width direction (see FIG. 1). Therefore, the pneumatic tires 1 of working examples 10 to 16 have common shapes and constructions.

However, material constituents of the pneumatic tires 1 of working examples 10 to 16 differ. An ordered description of these differences follows.

First, in working examples 10 to 14, a conventional mixing method is employed as the mixing method for the rubber composition used in the cap tread. Specifically, regarding the mixing method of the rubber composition, measured amounts of rubber ingredients and chemicals for compounding are kneaded in a sealed kneader to produce a kneaded material and this kneaded material is extruded at a target extrusion temperature of approximately 160° C. Next, the kneaded material is placed into the sealed kneader again and extruded at a target extrusion temperature of approximately 160° C. Kneading is repeated until a target viscosity is reached. After the kneading is completed, the kneaded material and vulcanization compounding chemicals are kneaded for a set kneading time in the sealed kneader.

The mixing method for the rubber composition in working examples 15 and 16 includes a step of kneading measured amounts of rubber ingredients and chemicals for compounding in a sealed kneader to produce a kneaded material and extruding this kneaded material at a target extrusion temperature of 135° C. or lower (but 120° C. or higher), and a step of kneading the extruded kneaded material at 90° C. or lower (but 50° C. or higher) using at least one roll mill kneader (1-step roll mixing method). Specifically, first, measured amounts of rubber ingredients and chemicals for compounding are placed in the sealed kneader and kneaded for a set amount of time and this kneaded material is extruded at an extrusion temperature of 135° C. or lower (not shown). Next, the kneaded material is fed into a kneading system line comprised of multiple kneading machines connected in a straight line. The kneaded material was sequentially carried down the kneading system line while being repeatedly kneaded by each kneading machine. Cooling means are used at this time that are linked to and control (provide kneading control) the set kneading time by the sealed kneader to ensure that the viscosity of the kneaded material reaches the target viscosity. After this kneading is completed, the kneaded material is fed by an intermediate transport conveyor into a final kneading machine. In this final kneading machine, the kneaded material and the vulcanization compounding chemicals are kneaded for a time corresponding to the set kneading time by the sealed kneader. Kneading is continued until a finished product is produced.

The rubber compositions in the pneumatic tires 1 of working examples 10 to 16 include a natural rubber (natural rubber STR20, manufactured by Thailand), a carbon black 1 (Shoblack N110, manufactured by Cabot Japan, K.K.; N2SA=144 m2/g) or a carbon black 2 (Shoblack N234, manufactured by Cabot Japan, K.K.; N2SA=123 m2/g), a zinc oxide (Zinc Oxide #3, manufactured by Seido Chemical Industry Co., Ltd.), a stearic acid (Industrial Stearic Acid, manufactured by Chiba Fatty Acid Co., Ltd.), an antiaging agent (Antigene6C, manufactured by Sumitomo Chemical Co., Ltd.), a sulfur ("Golden Flower" Oil Treated Sulfur Powder, manufactured by Tsurumi Chemical), and a vulcanization accelerator (NOCCELER NS-F, manufactured by Ouchi Shinko Chemical Industrial Co., Ltd.).

Furthermore, based on the formulation and mixing method chosen for the rubber composition, the rubber hardness of the rubber composition at 20° C. (20° C. hardness), elongation at break (EB), and heat generation properties (preferably a distortion is 10±2% and a tan δ at 60° C. is less than 0.14) differ.

Note that the pneumatic tires 1 of working examples 1 to 10 listed in FIG. 3 employ common compounding ratios and mixing methods for the rubber compositions. As a result, the score for the abrasion resistance performance for each of the pneumatic tires 1 was 100 (the same as working example 10 listed in FIG. 4).

As shown in the test results, it is clear that, in comparing working example 10 and working example 11, the rubber hardness increases when a compounded amount of the carbon black 1 in the rubber composition is increased, leading to enhancements in the abrasion resistance performance and the uneven-wear resistance performance (see FIG. 4).

Additionally, in comparing working example 10 and working example 12, it is clear that when the type of carbon black in the rubber composition is changed (changed to carbon black 1), the rubber hardness increases while heat generation properties are maintained, leading to enhancements in the abrasion resistance performance and the uneven-wear resistance performance.

Furthermore, in comparing working example 10 and working example 13, it is clear that when a compounded amount of the sulfur in the rubber composition is increased, the heat generating properties improve and the rubber hardness increases, leading to an enhancement in abrasion resistance performance.

Moreover, in comparing working example 10 and working example 14, it is clear that when a mixing temperature of the rubber composition is lowered to 120° C., elongation at break properties improve, and the rubber hardness increases, leading to enhancements in the abrasion resistance performance and the uneven-wear resistance performance.

Additionally, in comparing working example 10 with working example 15 and working example 16, it is clear that by performing the 1-step roll mixing method described above at a mixing temperature of 120° C. or lower, heat generation properties and elongation at break properties are maintained, rubber hardness reaches or exceeds a target hardness (66), and sufficient abrasion resistance performance is obtained. For example, in each of working examples 15 and 16, abrasion resistance performance and uneven-wear resistance performance superior to those of working example 10 were obtained regardless of the change made to the type of carbon black.

Effects

As described above, with the pneumatic tire 1, the rubber composition for use in the cap tread preferably has a rubber hardness at 20° C. according to JIS-K6253 of 66 or higher (see working examples 11, 13, 15, and 16 listed in FIG. 4). With such a configuration, the rubber hardness of the rubber composition is optimized, which leads to clear enhancements in the abrasion resistance performance and the uneven-wear resistance performance of the tire. Note that an upper limit of the rubber hardness of the rubber composition is not particularly limited, but the upper limit is preferably set, for example, at 76 or lower.

Additionally, with the configuration described above, the rubber composition preferably has an elongation at break of 400% or greater, a distortion of 10±2%, and a tan δ at 60° C. of less than 0.14 (see working examples 15 and 16 listed in FIG. 4). With such a configuration, elongation at break and heat generation properties of the rubber composition are optimized, which leads to enhancements in the abrasion resistance performance and the uneven-wear resistance performance of the tire. Note that an upper limit of the elongation at break of the rubber composition is not particularly limited, but the upper limit is preferably set, for example, at 700 or lower. Additionally, a lower limit of the tan δ of the rubber composition is not particularly limited, but the lower limit is preferably set, for example, at 0.03 or lower.

With such a configuration, the rubber composition is preferably produced through a mixing method including a step of kneading measured amounts of rubber ingredients and chemicals for compounding in a sealed kneader to produce a kneaded material and extruding this kneaded material at a target extrusion temperature of 135° C. or lower, and a step of kneading the extruded kneaded material at 90° C. or lower using at least one roll mill kneader (see working examples 15 and 16 listed in FIG. 4). This leads to obtaining optimal heat generation properties, elongation at break properties, and rubber hardness described above. Note that a lower limit of the extrusion temperature of the kneaded material is preferably 120° C. or higher and a lower limit of the kneading temperature in the roll mill kneader is preferably 50° C. or higher.

Furthermore, with the configuration described above, the rubber composition preferably includes a natural rubber and a carbon black having a nitrogen specific surface area (N2SA) of N2SA=from 100 to 160 m2/g, and a compounded amount of the carbon black is preferably from 40 to 60 parts by weight, and more preferably from 45 to 55 parts by weight. This leads to the obtaining of the optimal heat generation properties, elongation at break properties, and rubber hardness described above.

As described above, the pneumatic tire according to the present technology is advantageous because the pneumatic tire has improved uneven-wear resistance.

What is claimed is:

1. A pneumatic tire comprising in a tread portion four circumferential main grooves extending in a tire circumferential direction and five ribs formed by the circumferential main grooves partitioning the tread portion, wherein,
when a cross-section is viewed from a tire meridian direction, a contact patch of a center rib and intermediate ribs in a center region of the tread portion comprises a smooth curved line forming a convex on an outer side in a tire radial direction, and a contact patch of a shoulder rib in a shoulder region of the tread portion comprises a smooth curved line forming a convex on an inner side in the tire radial direction;
based on a point of intersection P of the curved line of the center rib and the intermediate ribs and the curved line of the shoulder rib, a distance within the shoulder rib between an extended line of the curved line of the center rib and the intermediate ribs and the curved line of the shoulder rib increases from the point of intersection P towards an outer side in a tire width direction, the point of intersection P being located at an edge of the shoulder rib on an inner side in the tire width direction; and a tread width TW, a gross width GW of the groove widths of the circumferential main grooves, a width TWc of the center rib, a width TWx of the intermediate ribs, and a width TWsh of the shoulder rib satisfies TWsh/(TW/2)=0.40 and 0.20≥GW/TW≥0.15, and also satisfies TWsh/TWc=1.05.

2. The pneumatic tire according to claim 1, wherein a center part of the shoulder rib has a sipeless construction.

3. The pneumatic tire according to claim 1, wherein a groove depth GDsh of the circumferential main groove partitioning the shoulder rib and the width TWsh satisfy TWsh/GDsh≥2.00.

4. The pneumatic tire according to claim 1, wherein a rubber hardness of the shoulder rib according to Japanese Industrial Standard K6253 is 60 or higher.

5. The pneumatic tire according to claim 1, wherein the shoulder rib comprises a narrow groove.

6. The pneumatic tire according to claim 1, wherein the pneumatic tire is a heavy duty pneumatic tire.

7. The pneumatic tire according to claim 1, wherein a rubber hardness at 20° C. according to Japanese Industrial Standard K6253 of a rubber composition used in a cap tread is between 66 and 76.

8. The pneumatic tire according to claim 1, wherein a rubber composition used in a cap tread has an elongation at break of from 400% to 700%, a distortion of 10±2%, and a tan δ at 60° C. of from 0.03 to 0.14.

9. The pneumatic tire according to claim 1, further comprising a rubber composition forming at least a portion of the pneumatic tire, the rubber composition comprising a natural rubber and a carbon black having a nitrogen specific surface area (N2SA) of N2SA=from 100 to 160 m2/g.

10. The pneumatic tire according to claim 9, wherein a compounded amount of the carbon black is from 40 to 60 parts by weight.

11. The pneumatic tire according to claim 10, wherein a compounded amount of the carbon black is from 45 to 55 parts by weight.

12. The pneumatic tire according to claim 1, wherein a rubber composition used in a cap tread has an elongation at break of from 400% to 510%, a distortion of 10±2%, and a tan δ at 60° C. of from 0.03 to 0.14.

13. The pneumatic tire according to claim 1, wherein GW/TW≈0.15.

* * * * *